United States Patent
Jin et al.

(10) Patent No.: US 10,432,501 B2
(45) Date of Patent: Oct. 1, 2019

(54) SDN ARCHITECTURE AND METHOD FOR FORWARDING MESSAGE BASED ON SDN ARCHITECTURE

(71) Applicant: ZTE Corporation, Shenzhen (CN)

(72) Inventors: Feicai Jin, Shenzhen (CN); Ran Chen, Shenzhen (CN); Yanjie Zhao, Shenzhen (CN); Xinwen Jiao, Shenzhen (CN)

(73) Assignee: XI'AN Zhongxing New Software Co., LTD., Shaanxi (CN)

( * ) Notice: Subject to any disclaimer, the term of this patent is extended or adjusted under 35 U.S.C. 154(b) by 185 days.

(21) Appl. No.: 15/511,417

(22) PCT Filed: May 12, 2015

(86) PCT No.: PCT/CN2015/078804
§ 371 (c)(1),
(2) Date: Mar. 15, 2017

(87) PCT Pub. No.: WO2016/041367
PCT Pub. Date: Mar. 24, 2016

(65) Prior Publication Data
US 2017/0257305 A1 Sep. 7, 2017

(30) Foreign Application Priority Data
Sep. 15, 2014 (CN) .......................... 2014 1 0469598

(51) Int. Cl.
*H04L 12/751* (2013.01)
*H04L 12/707* (2013.01)
(Continued)

(52) U.S. Cl.
CPC .............. *H04L 45/02* (2013.01); *H04L 45/22* (2013.01); *H04L 45/38* (2013.01); *H04L 45/42* (2013.01);
(Continued)

(58) Field of Classification Search
CPC ......... H04L 45/38; H04L 45/64; H04L 45/42; H04L 45/021; H04L 45/02; H04L 67/2838; H04L 67/2823; H04L 45/22
See application file for complete search history.

(56) References Cited

U.S. PATENT DOCUMENTS 9,450,817 B1 * 9/2016 Bahadur .................. H04L 45/64
2013/0163475 A1 * 6/2013 Beliveau ............... H04L 67/327
370/257
(Continued)

FOREIGN PATENT DOCUMENTS

CN 103647658 A 3/2014
CN 103685250 A 3/2014
(Continued)

OTHER PUBLICATIONS

International Search Report for corresponding PCT/CN2015/078804 filed on May 12, 2015; dated Aug. 17, 2015.
(Continued)

*Primary Examiner* — Will W Lin
(74) *Attorney, Agent, or Firm* — Cantor Colburn LLP

(57) ABSTRACT

An SDN architecture and a method for forwarding message based on the SDN architecture are provided. The SDN architecture includes controllers and a forwarding device, and the SDN further includes: a monitoring controller, which is connected between the multiple controllers and the forwarding device and configured to receive or monitor control plane messages of the multiple controllers, and determine a flow table to be sent to the forwarding device according to a local strategy and the control plane messages of the multiple controllers.

18 Claims, 6 Drawing Sheets

(51) Int. Cl.
*H04L 12/721* (2013.01)
*H04L 12/715* (2013.01)
*H04L 29/08* (2006.01)
*H04L 12/717* (2013.01)

(52) U.S. Cl.
CPC .......... *H04L 45/64* (2013.01); *H04L 67/2823* (2013.01); *H04L 67/2838* (2013.01)

(56) References Cited

U.S. PATENT DOCUMENTS

| | | | | |
|---|---|---|---|---|
| 2014/0369348 A1* | 12/2014 | Zhang | H04L 45/121 | 370/389 |
| 2015/0312142 A1* | 10/2015 | Barabash | H04L 45/42 | 370/400 |
| 2015/0358236 A1* | 12/2015 | Roach | H04L 43/065 | 370/235 |
| 2015/0372840 A1* | 12/2015 | Benny | H04L 12/4675 | 370/409 |
| 2016/0080263 A1* | 3/2016 | Park | G06F 17/30345 | 370/392 |
| 2016/0127272 A1* | 5/2016 | Wang | H04L 45/66 | 370/392 |
| 2016/0156552 A1* | 6/2016 | Li | H04L 12/6418 | 370/392 |
| 2016/0197831 A1* | 7/2016 | De Foy | H04L 45/7453 | 370/392 |
| 2016/0315847 A1* | 10/2016 | Zhang | H04L 12/6418 | |
| 2017/0086126 A1* | 3/2017 | Xiong | H04W 8/08 | |

FOREIGN PATENT DOCUMENTS

| | | |
|---|---|---|
| CN | 103905523 A | 7/2014 |
| CN | 104009871 A | 8/2014 |

OTHER PUBLICATIONS

European Search Report for corresponding application EP15841768; Report dated Aug. 22, 2017.
Rob Sherwood, "FlowVisor: A Network Virtualization Layer FlowVisor: A Network Virtualization Layer", Oct. 14, 2009, Retrieved from the Internet: URL: Http//openflow.org/downloads/technicalreports/openflow-tr-2009-1-flowvisor.pdf, XP055091501.

* cited by examiner

SDN ARCHITECTURE AND METHOD FOR FORWARDING MESSAGE BASED ON SDN ARCHITECTURE

TECHNICAL FIELD

The present disclosure relates to the field of communications, and more particularly to an SDN architecture and a method for forwarding message based on the SDN architecture.

BACKGROUND

Along with the proposal of an SDN concept and the development of applications thereof, an OpenFlow technology, as a core SDN technology, is currently in a rapid development stage. At present, the OpenFlow networks constructed by virtue of the OpenFlow technology have been more and more applied to practical production and life. The OpenFlow network adopts an architecture in which the control plane and the forwarding plane (which is also called as the data plane or the user plane) are separated from each other. FIG. 1 is an architecture diagram of an OpenFlow network according to a related technology. As shown in FIG. 1, the control plane of the OpenFlow network is implemented by an OpenFlow controller. The OpenFlow controller is a device with a high computing capability. Specifically, it may be a personal computer, a server, a server cluster or the like. The forwarding plane of the OpenFlow network is implemented by an OpenFlow switch. The OpenFlow switch is a device with a high switching capability, and it may be a network element which is provided with multiple network ports and performs message processing and forwarding on the basis of flow tables. The interface between the OpenFlow controller and the OpenFlow switch follows an OpenFlow protocol, so that the interface is also called as an OpenFlow channel.

The OpenFlow protocol is regulated and modified by the Open Networking Foundation (ONF), an international standard organization. The current OpenFlow protocol specifies that: in an OpenFlow network, all control functions are credited to the OpenFlow controllers, and the OpenFlow controllers control forwarding behaviors of the OpenFlow switch through OpenFlow channels, and each controller is connected with the OpenFlow switch through the OpenFlow channels. The OpenFlow switch may communicate with an independent controller, and may also communicate with multiple controllers at the same time to improve reliability, and during the communication with the multiple controllers, communication and state synchronization between each controller are required.

At present, there is no communication standard between controllers, there exist problems about communication between controllers of different manufacturers, and moreover, the controllers of different manufacturers have different decisions on the forwarding device t, which may cause disorder of forwarding behaviors and is also unfavorable for the resources allocation of the forwarding device.

SUMMARY

For the technical problem of message forwarding behavior disorder caused by lack of a communication standard between controllers in the related technology, embodiments of the present disclosure provide an SDN architecture and a method for forwarding message based on an SDN architecture, so as to at least solve the above problem.

According to an embodiment of the present disclosure, an SDN architecture is provided, which may include controllers and forwarding device, and the SDN architecture further include: a monitoring controller, connected between the multiple controllers and the forwarding device and configured to receive or monitor control plane messages of the multiple controllers, and determine a flow table to be sent to the forwarding device according to a local strategy and the control plane messages of the multiple controllers.

In the embodiment, one end of the monitoring controller may be logically connected with the multiple controllers, and the other end may be logically connected with the forwarding device; the multiple controllers may be logically connected with the forwarding device through the monitoring controller; and the monitoring controller may be configured to receive first control plane messages from the multiple controllers, process the first control plane messages to obtain second control plane messages according to the local strategy, and send the second control plane messages to the forwarding device.

In the embodiment, the monitoring controller may be configured to generate a flow table according to the local strategy and the control plane messages of the multiple controllers, and determine the generated flow table as the flow table to be sent to the forwarding device.

In the embodiment, logical connection channels between the monitoring controller and the multiple controllers may include: first main connection channels and first auxiliary connection channels, wherein there may be zero, one or multiple first auxiliary connection channels.

In the embodiment, logical connection channels between the monitoring controller and the forwarding device may include: a second main connection channel and a second auxiliary connection channel, wherein there may be zero, one or multiple second auxiliary connection channels.

In the embodiment, the monitoring controller may further be configured to receive a third control plane message from the forwarding device, process the third control plane message to obtain a fourth control plane message according to the local strategy, and send the fourth control plane message to the multiple controllers.

In the embodiment, the multiple controllers may be directly connected with the forwarding device logically, and the multiple controllers may be connected with the forwarding device through the monitoring controller physically, wherein the monitoring controller may be configured to monitor the control plane messages of the multiple controllers.

In the embodiment, logical connection channels between the multiple controllers and the forwarding device may include: third main connection channels and one or more third auxiliary connection channels; and the monitoring controller may be configured to transparently transmit the control plane messages of the multiple controllers on the third main connection channels, and selectively discard or forward the control plane messages of the multiple controllers on the third auxiliary connection channels.

In the embodiment, the monitoring controller may be configured to select a flow table from flow tables carried in the control plane messages of the multiple controllers, and determine the selected flow table as the flow table to be sent to the forwarding device.

In the embodiment, the monitoring controller may further be configured to transparently transmit the control plane message from the forwarding device to the multiple controllers.

In the embodiment, each controller may have the same decision making right for the forwarding device.

According to another embodiment of the present disclosure, an SDN-architecture-based message forwarding processing method is provided, which may include that: a monitoring controller receives or monitors control plane messages of multiple controllers in an SDN architecture; the monitoring controller determines a flow table according to a local strategy and the control plane messages of the multiple controllers; and the monitoring controller sends the determined flow table to forwarding device configured for message forwarding.

In the embodiment, one end of the monitoring controller may be logically connected with the multiple controllers, and the other end may be logically connected with the forwarding device; the multiple controllers may be logically connected with the forwarding device through the monitoring controller; and the step that the monitoring controller receives the control plane messages of the multiple controllers in the SDN architecture may include that: the monitoring controller receives the control plane messages through logical connection channels between the monitoring controller and the multiple controllers.

In the embodiment, the step that the monitoring controller determines the flow table according to the local strategy and the control plane messages of the multiple controllers may include that: the monitoring controller generates a flow table according to the local strategy and the control plane messages of the multiple controllers, and determines the generated flow table as the flow table to be sent to the forwarding device.

In the embodiment, the multiple controllers may be directly connected with the forwarding device logically, and the multiple controllers may be connected with the forwarding device through the monitoring controller physically; and the step that the monitoring controller monitors the control plane messages of the multiple controllers in the SDN architecture may include that: the monitoring controller monitors the control plane messages, sent on logical connection channels between the multiple controllers and the forwarding device, of the multiple controllers.

In the embodiment, the step that the monitoring controller determines the flow table according to the local strategy and the control plane messages of the multiple controllers may include that: the monitoring controller selects a flow table from flow tables carried in the control plane messages of the multiple controllers, and determines the selected flow table as the flow table to be sent to the forwarding device.

According to another embodiment of the present disclosure, a method for forwarding message based on an SDN architecture is provided, which may include that: forwarding device in an SDN architecture receives a flow table forwarded by a monitoring controller, wherein the flow table may be a flow table determined by the monitoring controller according to a local strategy and control plane messages of multiple controllers; and the forwarding device performs message forwarding according to the flow table forwarded by the monitoring controller.

According to the embodiments of the present disclosure, by virtue of the monitoring controller connected between the multiple controllers and the forwarding device, the flow table to be sent to the forwarding device is determined according to the received or monitored control plane messages of the multiple controllers and the local strategy, so that the technical problem of message forwarding behavior disorder, which is caused by lack of a communication standard between the multiple controllers and incapability in unified coordination of decisions of the multiple controllers for the forwarding device, in the related technology are solved, and reliability of a network and message forwarding accuracy are further improved.

BRIEF DESCRIPTION OF THE DRAWINGS

The drawings described here are adopted to provide a further understanding to the present disclosure, and form a part of the present disclosure. Schematic embodiments of the present disclosure and descriptions thereof are adopted to explain the present disclosure and not intended to form improper limits to the present disclosure. In the drawings.

DETAILED DESCRIPTION OF THE EMBODIMENTS

The present disclosure will be described below with reference to the drawings and the embodiments in detail. It is important to note that the embodiments in the present disclosure and characteristics in the embodiments may be combined under the condition of no conflicts.

For the technical problems of message forwarding behavior disorder caused by lack of a communication standard between the multiple controllers and incapability in unified coordination of decisions of the multiple controllers for the forwarding device and the like in the related technology, the embodiments of the present disclosure provide corresponding solutions, which will be described in detail.

Figure 1:
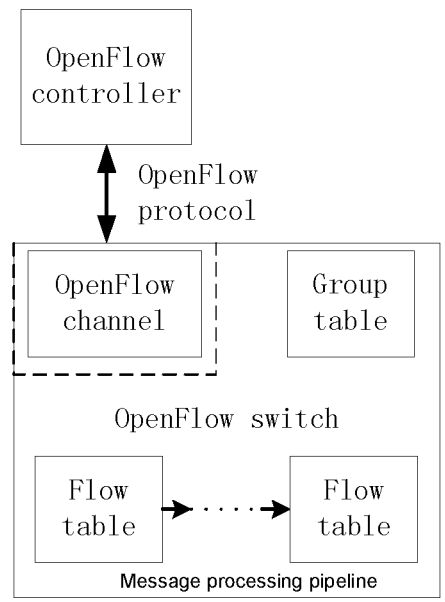
FIG. 1 is an architecture diagram of an OpenFlow network according to the related technology.
Figure 2:
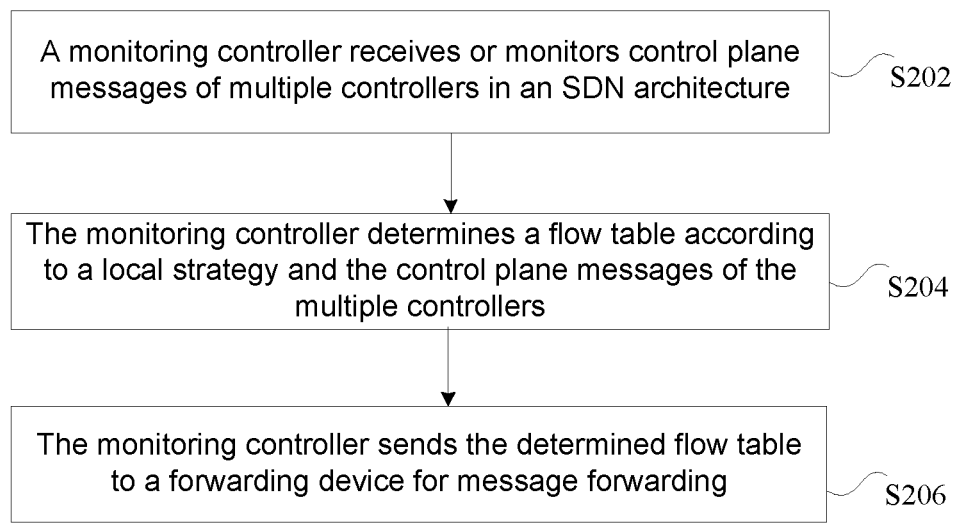
FIG. 2 is a flowchart of an SDN-architecture-based message forwarding processing method according to an embodiment of the present disclosure.

FIG. 2 is a flowchart of an SDN-architecture-based message forwarding processing method according to an embodiment of the present disclosure. As shown in FIG. 2, the method includes:

Step S202: a monitoring controller receives or monitors control plane messages of multiple controllers in an SDN architecture;

Step S204: the monitoring controller determines a flow table according to a local strategy and the control plane messages of the multiple controllers; and Step S206: the monitoring controller sends the determined flow table to forwarding device configured for message forwarding.

By each of the processing steps, the flow table may be determined and sent to the forwarding device by virtue of the monitoring controller according to the local strategy and the control plane messages of the multiple controllers, so that a series of problems caused by lack of a corresponding communication standard for communication between the multiple controllers and particularly the problems of message forwarding behavior disorder resulted therefrom and the like may be radically avoided. Based on the processing steps, decisions of the multiple controllers for the forwarding device may be coordinated in a unified manner, so that reliability of a network and message forwarding accuracy are improved.

In a preferred embodiment, the monitoring controller is connected between the multiple controllers and the forwarding device, that is, the multiple controllers form communication connection with the forwarding device through the monitoring controller, wherein there are two connecting conditions.

(1) One end of the monitoring controller is logically connected with the multiple controllers, and the other end is logically connected with the forwarding device; the multiple controllers are logically connected with the forwarding device through the monitoring controller; and at this moment, the operation that the monitoring controller receives the control plane messages of the multiple controllers in the SDN architecture in Step S202 may be represented in, but not limited to, the following form: the monitoring controller receives the control plane messages through logical connection channels between the monitoring controller and the multiple controllers.

In a preferred embodiment of the embodiments, Step S204 may be implemented in, but not limited to, the following manner: the monitoring controller generates a flow table according to the local strategy and the control plane messages of the multiple controllers, and determines the generated flow table as the flow table to be sent to the forwarding device.

(2) The multiple controllers are directly connected with the forwarding device logically, and the multiple controllers are connected with the forwarding device through the monitoring controller physically; and at this moment, the operation that the monitoring controller monitors the control plane messages of the multiple controllers in the SDN architecture in Step S202 may be represented in, but not limited to, the following implementation form: the monitoring controller monitors the control plane messages, sent on logical connection channels between the multiple controllers and the forwarding device, of the multiple controllers.

In a preferred embodiment of the embodiments, the step that the monitoring controller determines the flow table according to the local strategy and the control plane messages of the multiple controllers may be implemented in, but not limited to, the following manner: the monitoring controller selects a flow table from flow tables carried in the control plane messages of the multiple controllers, and determines the selected flow table as the flow table to be sent to the forwarding device.

The SDN-architecture-based message forwarding processing method provided by the embodiments may be applicable to the following conditions: each controller in the multiple controllers has the same decision making right for the forwarding device.

In a preferred implementation process, the local strategy includes, but not limited to, one of that: a flow table with most same forwarding strategies in flow tables of the multiple controllers is taken as a reference (i.e. a principle of minority obeying the majority); and the flow table of a specified controller in the multiple controllers is taken as a reference.

Figure 3:
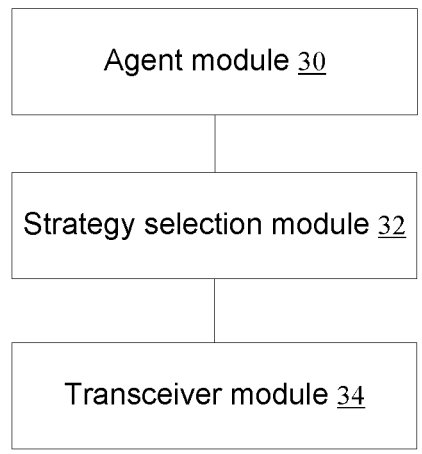
FIG. 3 is a structure block diagram of an SDN-architecture-based message forwarding processing device according to an embodiment of the present disclosure.

In the embodiments, an SDN architecture-based message forwarding processing device is further provided. The device is configured to implement the method, and may also be applied to a monitoring controller. As shown in FIG. 3, the device includes:

an agent module 30, configured to receive or monitor control plane messages of multiple controllers in an SDN architecture;

a strategy selection module, connected to the agent module 30, connected to a transceiver module 34 and configured to determine a flow table according to a local strategy and the control plane messages of the multiple controllers; and the transceiver module 34, connected to the strategy selection module 32 and configured to send the determined flow table to forwarding device configured for message forwarding.

In a preferred implementation process, the agent module 30 is configured to receive flow tables, meeting the following requirement, of the multiple controllers: each controller in the multiple controllers has the same decision making right for the forwarding device.

It is important to note that each module may be implemented through software or hardware, and the latter may be implemented in, but not limited to, the following manner: the agent module 30, the strategy selection module 32 and the transceiver module 34 are all located in the same processor; or, the agent module 30, the strategy selection module 32 and the transceiver module 34 are located in a first processor, a second processor and a third processor respectively.

Figure 4:
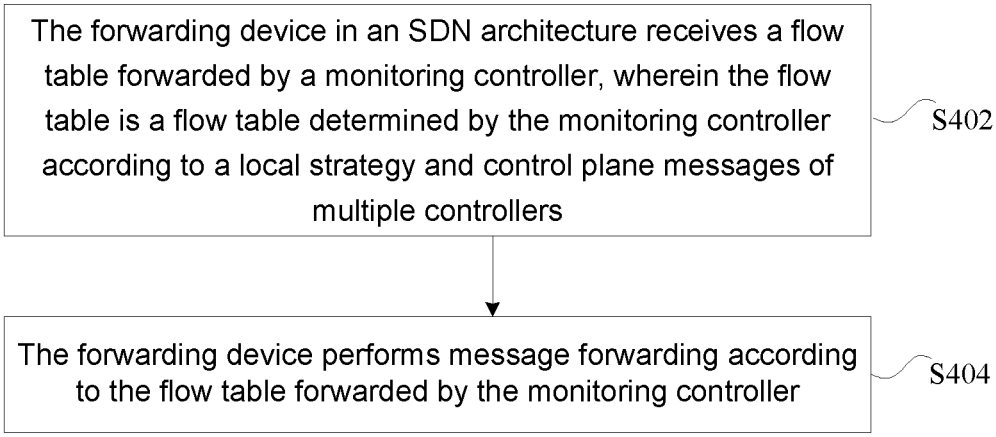
FIG. 4 is a flowchart of a method for forwarding message based on an SDN architecture according to an embodiment of the present disclosure.

In the embodiments, a method for forwarding message based on an SDN architecture is further provided. As shown in FIG. 4, the method includes the following processing steps:

Step S402: forwarding device in an SDN architecture receives a flow table forwarded by a monitoring controller, wherein the flow table is a flow table determined by the monitoring controller according to a local strategy and control plane messages of multiple controllers; and Step S404: the forwarding device performs message forwarding according to the flow table forwarded by the monitoring controller.

In a preferred embodiment of the SDN-architecture-based message forwarding method, each controller in the multiple controllers has the same decision making right for the forwarding device.

Figure 5A:
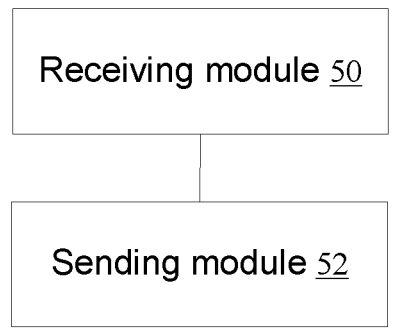
FIG. 5a is a structure block diagram of a method for forwarding message based on an SDN architecture according to an embodiment of the present disclosure.

The embodiments of the present disclosure further provide an SDN-architecture-based message forwarding device. The device is configured to implement the method shown in FIG. 4, and the device may be applied to forwarding device in an SDN architecture. As shown in FIG. 5a, the device includes:

a receiving module 50, configured to receive a flow table forwarded by a monitoring controller, wherein the flow table is a flow table determined by the monitoring controller according to a local strategy and control plane messages of multiple controllers; and a sending module 52, connected to the receiving module 50 and configured to perform message forwarding according to the flow table forwarded by the monitoring controller.

It is important to note that each module may be implemented through software or hardware, and the latter may be implemented in, but not limited to, the following manner: the receiving module 50 and the sending module 52 are both located in the same processor; or, the receiving module 50 and the sending module 52 are located in a first processor and a second processor respectively.

Figure 5B:
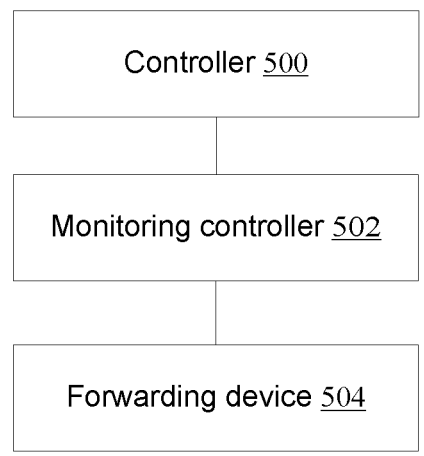
FIG. 5b is a structure block diagram of a method for forwarding message based on an SDN architecture according to an embodiment of the present disclosure.

The embodiments of the present disclosure further provide an SDN-architecture-based message forwarding system, as shown in FIG. 5b, the system includes: controllers 500, a monitoring controller 502 and forwarding device 504, wherein the monitoring controller 502 is connected between the multiple controllers 500 and the forwarding device 504, and is configured to receive or monitor control plane messages of the multiple controllers 500, and determine a flow table to be sent to the forwarding device 504 according to a local strategy and the control plane messages of the multiple controllers 500. A specific architecture may refer to FIG. 6 and FIG. 7. In a preferred implementation process, each controller has the same decision making right for the forwarding device.

An SDN architecture provided by the embodiments may be represented by two forms.

(1) One end of the monitoring controller is logically connected with the multiple controllers, and the other end is logically connected with the forwarding device; the multiple controllers are logically connected with the forwarding device through the monitoring controller; and the monitoring controller is configured to receive first control plane messages from the multiple controllers, process the first control plane messages to obtain second control plane messages according to the local strategy, and send the second control plane messages to the forwarding device.

At this moment, the monitoring controller is configured to generate a flow table according to the local strategy and the control plane messages of the multiple controllers, and determine the generated flow table as the flow table to be sent to the forwarding device.

In a preferred implementation process, logical connection channels between the monitoring controller and the multiple controllers include: first main connection channels and first auxiliary connection channels, wherein there is zero, one or multiple first auxiliary connection channels.

In another preferred implementation process, logical connection channels between the monitoring controller and the forwarding device include: a second main connection channel and a second auxiliary connection channel, wherein there is zero, one or multiple second auxiliary connection channels.

(2) The multiple controllers are directly connected with the forwarding device logically, and the multiple controllers are connected with the forwarding device through the monitoring controller physically, wherein the monitoring controller is configured to monitor the control plane messages of the multiple controllers.

In a preferred embodiment, logical connection channels between the multiple controllers and the forwarding device include: third main connection channels and one or more third auxiliary connection channels; and the monitoring controller is configured to transparently transmit the control plane messages of the multiple controllers on the third main connection channels, and/or, is configured to selectively discard or forward the control plane messages of the multiple controllers on the third auxiliary connection channels.

At this moment, the monitoring controller may be configured to select a flow table from flow tables carried in the control plane messages of the multiple controllers, and determine the selected flow table as the flow table to be sent to the forwarding device.

In addition, the monitoring controller is further configured to transparently transmit the control plane message from the forwarding device to the multiple controllers.

In the embodiments, each controller has the same decision making right for the forwarding device.

For better understanding the embodiments, detailed descriptions will be made below with reference to preferred embodiments.

Embodiment 1

Figure 6:
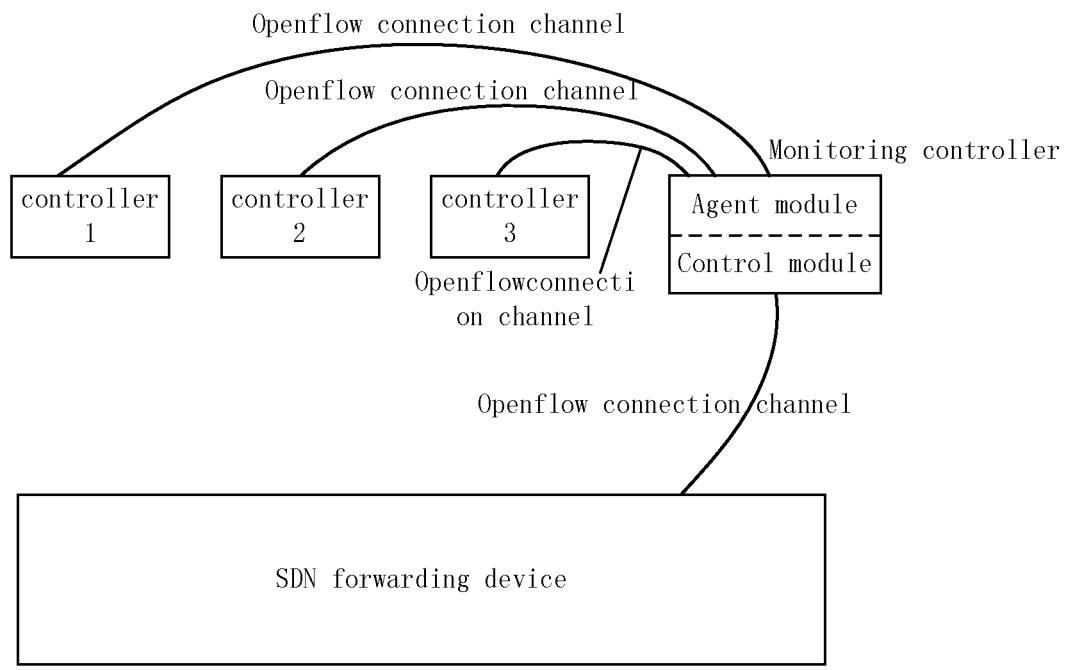
FIG. 6 is a structure diagram of an SDN-architecture-based message forwarding system according to embodiment 1 of the present disclosure.

FIG. 6 is a structure diagram of an SDN-architecture-based message forwarding system according to embodiment 1 of the present disclosure. The embodiment is also applicable to an Advanced Telecom Computing Architecture (ATCA)-based system, and includes the following contents.

1: There are multiple SDN controllers in an SDN architecture, wherein each controller runs an EQUAL mode. As shown in FIG. 6, there are multiple SDN controllers in the SDN architecture, i.e. a controller 1, a controller 2 and a controller 3. The three controllers all run the EQUAL mode. The EQUAL mode refers to that: each controller has the same decision making right for SDN forwarding device.

2: Each controller establishes connection channels (equivalent to first connection channels) with a monitoring controller, and communicates through the connection channels. Furthermore, each controller establishes the connection channels with an agent module of the monitoring controller.

Alternatively, each controller may selectively establish multiple auxiliary connection channels, besides a main connection channel, with the monitoring controller.

As shown in FIG. 6, connections are established between the controller 1 and the monitoring controller, between the controller 2 and the monitoring controller and between the controller 3 and the agent module of the monitoring controller. Each controller forwards a generated control plane message to the monitoring controller.

3: The monitoring controller establishes connection channels (equivalent to second connection channels) with the SDN forwarding device, and communicates through the connection channels.

As shown in FIG. 6, the monitoring controller establishes the connection channels with the SDN forwarding device.

Alternatively, the monitoring controller may selectively establish multiple auxiliary connection channels, besides a main connection, with the SDN forwarding device.

A control module of the monitoring controller selects a proper flow table for transmission to the SDN forwarding device according to own local strategy. The SDN forwarding device forwards the messages according to the flow table.

Embodiment 2

In the embodiment:

1: there are multiple SDN controllers in an SDN architecture, and each SDN controller runs an EQUAL mode.

Figure 7:
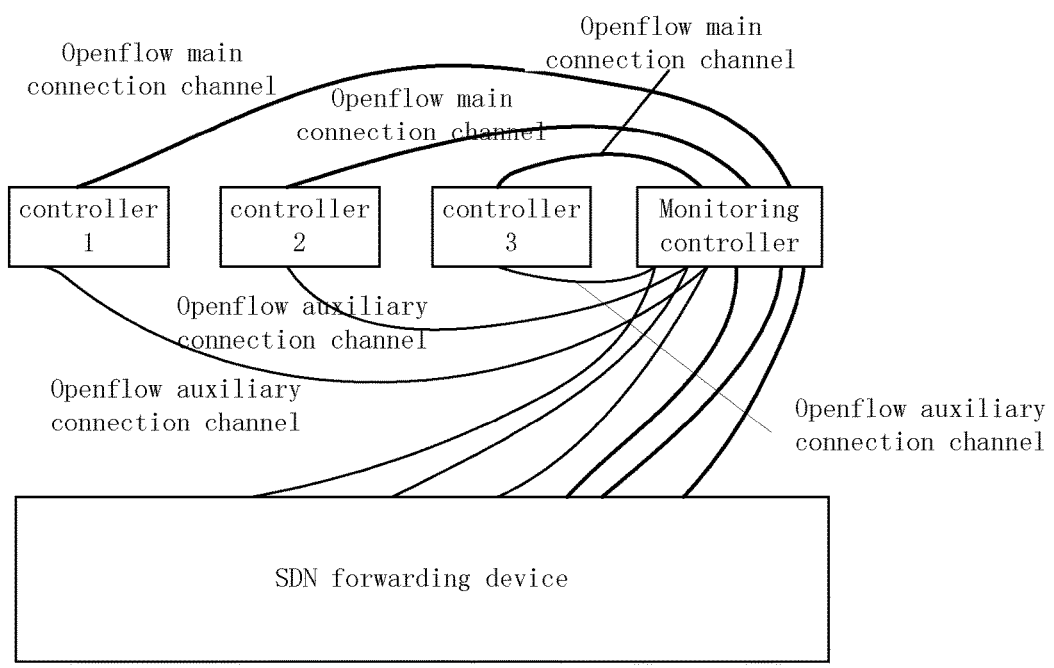
FIG. 7 is a structure diagram of an SDN-architecture-based message forwarding system according to embodiment 2 of the present disclosure.

FIG. 7 is a structure diagram of an SDN-architecture-based message forwarding system according to embodiment 2 of the present disclosure. As shown in FIG. 7, there are multiple SDN controllers in the SDN architecture, i.e. a controller 1, a controller 2 and a controller 3. The three controllers all run the EQUAL mode. The EQUAL mode refers to that: each controller has the same decision making right for SDN forwarding device.

2: Each controller establishes main and auxiliary connections with the SDN forwarding device. Internal channels of the multiple controllers are forced to be transferred to a monitoring controller. That is, each controller establishes main and auxiliary connection channels with the SDN forwarding device through the monitoring controller.

Alternatively, each controller may establish multiple connection channels with the SDN forwarding device, i.e. a main connection channel and multiple auxiliary connections.

The monitoring controller transparently transmits messages on the main connections, part of messages on the auxiliary connections, such as echo messages, may be transparently transmitted, and messages such as group tables and flow tables related to service forwarding may be transmitted to the SDN forwarding device only after decisions are made according to own local strategy.

The main connections are required to adopt Transfer Control Protocol (TCP) or Transport Layer Security Protocol (TLS) connections, and the connections may only be monitored, and may not be modified. The auxiliary connections adopt a User Datagram Protocol (UDP for link establishment, and may monitor and control transmission of all forwarding table entries and protocol messages.

Embodiment 3

Figure 8:
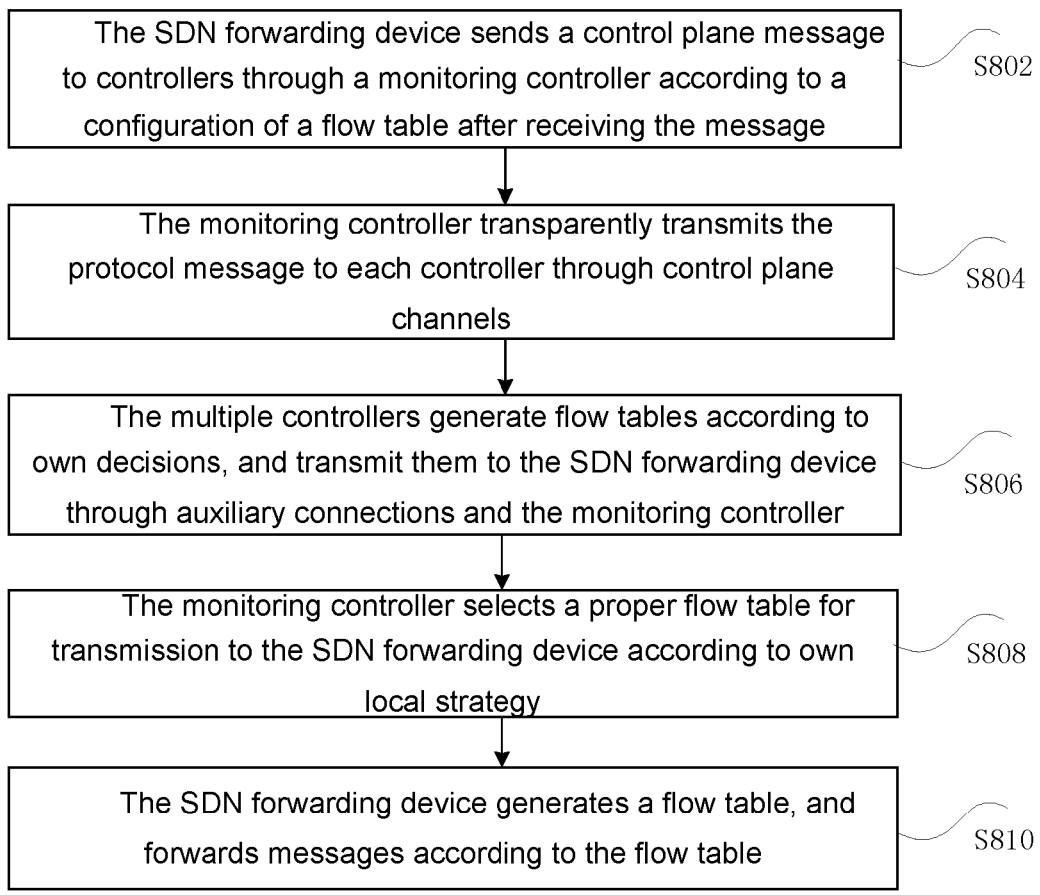
FIG. 8 is a flowchart of a method for forwarding message based on an SDN architecture according to embodiment 3 of the present disclosure.

The embodiment may be based on, but not limited to, a message forwarding system shown in FIG. 7. FIG. 8 is a flowchart of a method for forwarding message based on an SDN architecture according to embodiment 3 of the present disclosure. As shown in FIG. 8, the method includes the following steps.

Step S802: SDN forwarding device sends a control plane message to controllers through a monitoring controller according to a configuration of a flow table after receiving the message.

Of course, the SDN forwarding device may also select to directly discard the message according to the configuration of the flow table.

Step S804: the monitoring controller transparently transmits the protocol message to each controller through control plane channels.

As shown in FIG. 7, the monitoring controller transparently transmits the received protocol message to a controller 1, a controller 2 and a controller 3.

Step S806: the multiple controllers generate flow tables according to own decisions, and transmit them to the SDN forwarding device through auxiliary connections and the monitoring controller.

As shown in FIG. 7, an egress interface of a flow table generated by the controller 1 is a port 1, an egress interface of a flow table generated by the controller 2 is a port 2, and an egress interface of a flow table generated by the controller 3 is the port 1. There may exist a computing error of the controller 2, and the generated egress interface is the port 2. Of course, there also exists a scenario where a certain controller fails and may not generate any flow table and transmit the flow table. Each controller sends own generated flow table to the SDN forwarding device through the monitoring controller.

Step S808: the monitoring controller selects a proper flow table for transmission to the SDN forwarding device according to own local strategy.

As shown in FIG. 7, the monitoring controller collects the 3 flow tables transmitted by the 3 controllers, and selects to transmit the flow table generated by the controller 1 to the SDN forwarding device according to own local decision of the monitoring controller, for example, according to a principle of the minority obeying the majority.

Step S810: the SDN forwarding device generates a flow table, and forwards messages according to the flow table.

Those skilled in the art should know that the embodiment of the present disclosure may be provided as a method, a system or a computer program product. Therefore, the present disclosure may adopt a form of hardware embodiment, software embodiment or software and hardware embodiment. Moreover, the present disclosure may adopt a form of computer program product implemented on one or more computer-available storage media (including, but not limited to, a disk memory, an optical memory and the like) including computer-available program codes.

The present disclosure is described with reference to flowcharts and/or block diagrams of the method, device (system) and computer program product according to the embodiment of the present disclosure. It should be understood that each flow and/or block in the flowcharts and/or the block diagrams and combinations of the flows and/or blocks in the flowcharts and/or the block diagrams may be implemented by computer program instructions. These computer program instructions may be provided for a universal computer, a dedicated computer, an embedded processor or a processor of other programmable data processing device to generate a machine, so that a device for realizing a function specified in one flow or more flows in the flowcharts and/or one block or more blocks in the block diagrams is generated by the instructions executed through the computer or the processor of the other programmable data processing device.

These computer program instructions may also be stored in a computer-readable memory capable of guiding the computer or the other programmable data processing device to work in a specific manner, so that a product including an instruction device may be generated by the instructions stored in the computer-readable memory, the instruction device realizing the function specified in one flow or many flows in the flowcharts and/or one block or many blocks in the block diagrams.

These computer program instructions may further be loaded onto the computer or the other programmable data processing device, so that a series of operating steps are executed on the computer or the other programmable data processing device to generate processing implemented by the computer, and steps for realizing the function specified in one flow or many flows in the flowcharts and/or one block or many blocks in the block diagrams are provided by the instructions executed on the computer or the other programmable data processing device.

Based on the above contents, in another embodiment, software is provided, which is configured to execute the technical solutions described in the abovementioned embodiments and preferred implementation modes.

In another embodiment, a storage medium is further provided, in which the abovementioned software is stored, the storage medium including, but not limited to: an optical disk, a floppy disk, a hard disk, an erasable memory and the like.

Obviously, those skilled in the art should know that each module or each step of the present disclosure may be implemented by a universal computing device, and the modules or steps may be concentrated on a single computing device or distributed on a network formed by a plurality of computing devices, and may optionally be implemented by program codes executable for the computing devices, so that the modules or steps may be stored in a storage device for execution with the computing devices, the shown or described steps may be executed in sequences different from those described here in some circumstances, or may form each integrated circuit module respectively, or multiple modules or steps therein may form a single integrated circuit module for implementation. As a consequence, the present disclosure is not limited to any specific hardware and software combination.

The above is only the preferred embodiment of the present disclosure and not intended to limit the present disclosure. For those skilled in the art, the present disclosure may have various modifications and variations. Any modifications, equivalent replacements, improvements and the like made within the spirit and principle of the present disclosure shall fall within the scope of protection of the present disclosure.

INDUSTRIAL APPLICABILITY

Based on the technical solutions provided by the embodiments of the present disclosure, the technical means of determining the flow table to be sent to the forwarding device by virtue of the monitoring controller connected between the multiple controllers and the forwarding device according to the received or monitored control plane messages of the multiple controllers and the local strategy is adopted, so that the technical problems of message forwarding behavior disorder caused by lack of a communication standard between the multiple controllers and incapability in unified coordination of decisions of the multiple controllers for the forwarding device and the like in the related technology are solved, and reliability of a network and message forwarding accuracy are further improved.

What is claimed is:

1. A Software Defined Network (SDN) architecture, which comprises multiple controllers and a forwarding device, and the SDN architecture further comprise:
   a monitoring controller, connected between the multiple controllers and the forwarding device and configured to receive or monitor control plane messages of the multiple controllers, and determine a flow table to be sent to the forwarding device according to a local strategy and the control plane messages of the multiple controllers;
   wherein the multiple controllers are directly connected with the forwarding device logically, and the multiple controllers are connected with the forwarding device through the monitoring controller physically, wherein the monitoring controller is configured to monitor the control plane messages of the multiple controllers;
   wherein logical connection channels between the multiple controllers and the forwarding device comprise: third main connection channels and one or more third auxiliary connection channels; and
   the monitoring controller is configured to transparently transmit the control plane messages of the multiple controllers on the third main connection channels, and selectively discard or forward the control plane messages of the multiple controllers on the third auxiliary connection channels.

2. The SDN architecture according to claim 1, wherein one end of the monitoring controller is logically connected with the multiple controllers, and the other end is logically connected with the forwarding device; the multiple controllers are logically connected with the forwarding device through the monitoring controller; and the monitoring controller is configured to receive first control plane messages from the multiple controllers, process the first control plane messages to obtain second control plane messages according to the local strategy, and send the second control plane messages to the forwarding device.

3. The SDN architecture according to claim 2, wherein the monitoring controller is configured to generate the flow table according to the local strategy and the control plane messages of the multiple controllers, and determine the generated flow table as the flow table to be sent to the forwarding device.

4. The SDN architecture according to claim 3, wherein each controller has the same decision making right for the forwarding device.

5. The SDN architecture according to claim 2, wherein logical connection channels between the monitoring controller and the multiple controllers comprise first main connection channels, or the logical connection channels comprise the first main connection channels and one or more first auxiliary connection channels.

6. The SDN architecture according to claim 2, wherein logical connection channels between the monitoring controller and the forwarding device comprise a second main connection channel, or the logical connection channels comprise the second main connection channel and one or more second auxiliary connection channels.

7. The SDN architecture according to claim 2, wherein the monitoring controller is further configured to receive a third control plane message from the forwarding device, process the third control plane message to obtain a fourth control plane message according to the local strategy, and send the fourth control plane message to the multiple controllers.

8. The SDN architecture according to claim 2, wherein each controller has the same decision making right for the forwarding device.

9. The SDN architecture according to claim 1, wherein the monitoring controller is configured to select a flow table from flow tables carried in the control plane messages of the multiple controllers, and determine the selected flow table as the flow table to be sent to the forwarding device.

10. The SDN architecture according to claim 1, wherein the monitoring controller is further configured to transparently transmit the control plane message from the forwarding device to the multiple controllers.

11. The SDN architecture according to claim 10, wherein each controller has the same decision making right for the forwarding device.

12. The SDN architecture according to claim 1, wherein each controller has the same decision making right for the forwarding device.

13. A method for forwarding message based on Software Defined Network (SDN) architecture, comprising:
   receiving or monitoring, by a monitoring controller, control plane messages of multiple controllers in the SDN architecture;
   determining, by the monitoring controller, a flow table according to a local strategy and the control plane messages of the multiple controllers; and
   sending, by the monitoring controller, the determined flow table to a forwarding device for message forwarding;
   wherein the multiple controllers are directly connected with the forwarding device logically, and the multiple controllers are connected with the forwarding device through the monitoring controller physically, wherein the monitoring controller is configured to monitor the control plane messages of the multiple controllers;

wherein logical connection channels between the multiple controllers and the forwarding device comprise: third main connection channels and one or more third auxiliary connection channels; and the monitoring controller is configured to transparently transmit the control plane messages of the multiple controllers on the third main connection channels, and selectively discard or forward the control plane messages of the multiple controllers on the third auxiliary connection channels.

14. The method according to claim 13, wherein one end of the monitoring controller is logically connected with the multiple controllers, and the other end is logically connected with the forwarding device; the multiple controllers are logically connected with the forwarding device through the monitoring controller; and receiving, by the monitoring controller, the control plane messages of the multiple controllers in the SDN architecture comprises:

receiving, by the monitoring controller, the control plane messages through logical connection channels between the monitoring controller and the multiple controllers.

15. The method according to claim 14, wherein determining, by the monitoring controller, the flow table according to the local strategy and the control plane messages of the multiple controllers comprises: generating, by the monitoring controller, the flow table according to the local strategy and the control plane messages of the multiple controllers, and determining the generated flow table as the flow table to be sent to the forwarding device.

16. The method according to claim 13, wherein the multiple controllers are directly connected with the forwarding device logically, and the multiple controllers are connected with the forwarding device through the monitoring controller physically; and monitoring, by the monitoring controller, the control plane messages of the multiple controllers in the SDN architecture comprises:

monitoring, by the monitoring controller, the control plane messages, sent on logical connection channels between the multiple controllers and the forwarding device, of the multiple controllers.

17. The method according to claim 16, wherein determining, by the monitoring controller, the flow table according to the local strategy and the control plane messages of the multiple controllers comprises:

selecting, by the monitoring controller, a flow table from flow tables carried in the control plane messages of the multiple controllers, and determining the selected flow table as the flow table to be sent to the forwarding device.

18. A method for forwarding message based on Software Defined Network (SDN) architecture, comprising:

receiving, by a forwarding device in the SDN architecture, a flow table forwarded by a monitoring controller, wherein the flow table is a flow table determined by the monitoring controller according to a local strategy and control plane messages of multiple controllers; and performing, by the forwarding device, message forwarding according to the flow table forwarded by the monitoring controller;

wherein the multiple controllers are directly connected with the forwarding device logically, and the multiple controllers are connected with the forwarding device through the monitoring controller physically, wherein the monitoring controller is configured to monitor the control plane messages of the multiple controllers;

wherein logical connection channels between the multiple controllers and the forwarding device comprise: third main connection channels and one or more third auxiliary connection channels; and the monitoring controller is configured to transparently transmit the control plane messages of the multiple controllers on the third main connection channels, and selectively discard or forward the control plane messages of the multiple controllers on the third auxiliary connection channels.

* * * * *